(12) United States Patent
Mammou

(10) Patent No.: US 10,699,361 B2
(45) Date of Patent: Jun. 30, 2020

(54) METHOD AND APPARATUS FOR ENHANCED PROCESSING OF THREE DIMENSIONAL (3D) GRAPHICS DATA

(71) Applicant: ATI Technologies ULC, Markham (CA)

(72) Inventor: Khaled Mammou, Thornhill (CA)

(73) Assignee: ATI Technologies ULC, Markham, Ontario (CA)

(*) Notice: Subject to any disclaimer, the term of this patent is extended or adjusted under 35 U.S.C. 154(b) by 176 days.

(21) Appl. No.: 13/683,546

(22) Filed: Nov. 21, 2012

(65) Prior Publication Data
US 2014/0139513 A1     May 22, 2014

(51) Int. Cl.
*G06T 15/00* (2011.01)
*G06T 1/20* (2006.01)
*G06T 9/00* (2006.01)

(52) U.S. Cl.
CPC ............. *G06T 1/20* (2013.01); *G06T 9/001* (2013.01)

(58) Field of Classification Search
CPC ..... G09G 2340/02; G06T 15/005; G06T 9/00; G06T 9/001; G06T 2200/04; G06T 2200/28; H04N 19/46; H04N 21/234318; H04N 21/47205
See application file for complete search history.

(56) References Cited

U.S. PATENT DOCUMENTS

| | | | | |
|---|---|---|---|---|
| 5,999,189 A | * | 12/1999 | Kajiya | G06T 11/001 382/232 |
| 6,047,088 A | * | 4/2000 | van Beek | G06T 9/001 375/E7.083 |
| 6,525,725 B1 | * | 2/2003 | Deering | G06T 3/0093 345/419 |
| 2003/0145172 A1 | * | 7/2003 | Galbraith | G06F 12/0866 711/133 |
| 2005/0060446 A1 | * | 3/2005 | Parry | G11B 20/10 710/53 |
| 2006/0044313 A1 | * | 3/2006 | Lake | G06T 15/005 345/501 |
| 2007/0005795 A1 | * | 1/2007 | Gonzalez | G06F 17/30017 709/232 |

(Continued)

FOREIGN PATENT DOCUMENTS

WO    WO 2011110855 A2 *  9/2011

*Primary Examiner* — Sultana M Zalalee
(74) *Attorney, Agent, or Firm* — Faegre Drinker Biddle & Reath LLP

(57) ABSTRACT

A method and apparatus provides for enhanced processing of 3D graphics data such as image-based 3D graphics data. The image-based 3D graphics data may include data defining texture, bump, normals, displacement, etc for underlying objects. In one example, the method and apparatus compresses image-based 3D graphics data as one or more frames contained in one or more videos and decompresses the compressed 3D graphics data using video acceleration hardware provided by a GPU. In another example the method and apparatus may also selectively control caching of image-based 3D graphics data. Before so cached, the image-based 3D graphics data may be compressed as one or more frames contained in one or more videos using video acceleration hardware provided by the GPU to achieve efficient usage of cache space.

33 Claims, 8 Drawing Sheets

(56) References Cited

U.S. PATENT DOCUMENTS

| | | | |
|---|---|---|---|
| 2007/0130382 A1* | 6/2007 | Moll | G06F 12/0835 |
| | | | 710/22 |
| 2007/0201562 A1* | 8/2007 | Ganesh | G06F 9/5044 |
| | | | 375/240.26 |
| 2008/0056348 A1* | 3/2008 | Lyashevsky | H04N 19/61 |
| | | | 375/240.1 |
| 2008/0123750 A1* | 5/2008 | Bronstein | H04N 19/17 |
| | | | 375/240.24 |
| 2008/0170622 A1* | 7/2008 | Gordon | H04N 21/23412 |
| | | | 375/240.18 |
| 2009/0060032 A1* | 3/2009 | Schmit | H04N 19/61 |
| | | | 375/240.01 |
| 2009/0083279 A1* | 3/2009 | Hasek | H04L 67/2823 |
| 2009/0160857 A1* | 6/2009 | Rasmusson | G06T 11/001 |
| | | | 345/422 |
| 2010/0088733 A1* | 4/2010 | Chan | H04N 21/25808 |
| | | | 725/80 |
| 2010/0128778 A1* | 5/2010 | Ji | H04N 19/61 |
| | | | 375/240.2 |
| 2010/0149179 A1* | 6/2010 | de Aguiar et al. | 345/420 |
| 2011/0248986 A1* | 10/2011 | Neubrand | H04N 21/42607 |
| | | | 345/418 |
| 2012/0242671 A1* | 9/2012 | Wyatt | G09G 5/001 |
| | | | 345/520 |
| 2013/0024545 A1* | 1/2013 | Sheppard et al. | 709/217 |
| 2013/0332652 A1* | 12/2013 | Hayashi | G06F 12/0866 |
| | | | 711/103 |
| 2014/0092439 A1* | 4/2014 | Krig | G06T 9/001 |
| | | | 358/2.1 |

* cited by examiner

METHOD AND APPARATUS FOR ENHANCED PROCESSING OF THREE DIMENSIONAL (3D) GRAPHICS DATA

FIELD

The disclosure relates generally to methods and apparatus for enhanced processing of 3D graphics data.

BACKGROUND

Computer graphics technology provides methods to generate and process imagery on a computer. Unlike video, which represents realistic scenes from the real world, computer graphics is generated-imagery such as computer game visual imageries, animations, drawings, designs, graphical user interface, all of which are authored by graphics creation tools, and the like. With the advancements in computer graphics technology, computer graphics have evolved from two dimensional (2D) graphics such as icons, menu, pictures and other 2D objects, to moving images (i.e. animations) and to 3D graphics with 3D perspectives.

As computer graphics technology has improved, 3D computer graphics have become widespread today. In contrast to 2D computer graphics technology, 3D computer graphics technology use 3D graphics data (e.g. overlay mapping data, geometric data in a 3D Cartesian system, etc.) for the purposes of performing calculations and rendering 3D imagery on a computer. Various techniques in 3D computer graphics technology have been developed to achieve this purpose. One category of such techniques overlays 3D graphics data, such as surface texture, bumps, displacement, etc, on top of coarse geometry models to add a perception of detailed depth (e.g., skinning as generally known in the art). Such overlaid 3D graphics data is commonly defined in image maps as known in the art and in itself also forms images, e.g. raster images.

For example, texture mapping is a 3D graphics technique that employs data defining surface textures (e.g. color, lighting, shadow, or anything that conveys detailed texture information about the graphics) to add significant amount of details that simulate the appearance of materials. Typically, texture mapping applies a collection of texture data, i.e. a texture map as known in the art, to a surface of a shape or a polygon in an image every time when the surface is rendered. A light map is an example of such texture maps, wherein the light map comprises data defining lighting information for every texture coordinate corresponding to the surface. As such, the light map can be used to "light" the surface by applying (i.e. mapping) the lighting information to the surface every time when the surface is rendered.

As an improvement, normal mapping was developed to add effects based on surface normal data (e.g., imaginary lighting that is applied perpendicular to a surface of a polygon in an image) to increase lighting effects generating the perception of bumps and dents created by the reflection and/or refraction of the surface normals. Normal maps typically comprise data that defines normal vectors, which are encoded by colors. Normal maps use three channels (3 bytes) to encode this information to add additional lighting effects to the surface. With this information, normal mapping can create an illusion of high resolution on what is actually a low resolution surface.

Displacement mapping is an alternative to normal mapping in 3D graphics that adds the perception of details to a surface through geometry alteration. Instead of adding surface normal effects to the lighting of the surface, displacement mapping employs geometric data to alter the geometry of the surface, e.g. displacing certain points of the surface to new positions. In so displacing, normal mapping gives the surface a great sense of depth and detail, permitting self-occlusion, self-shadowing and silhouettes, etc to be shown in the graphics.

The image maps used by 3D graphics techniques, e.g., the texture, displacement, normal maps, etc, form one or more images, etc.

In addition to generating 3D effects using various mapping techniques described above, 3D computer graphics technology also provides various methods to generate 3D graphics by employing data that defines 3D geometric models, i.e. the shape, for an object. These models describe 3D objects on a computer using mathematic primitives such as spheres, cube, cones and polygons, etc. The most common type of 3D geometric models is polygon mesh, also known as 3D mesh. 3D mesh is represented by a collection data of vertices, edges, faces, and polygons, etc defining the shape of a 3D object. With such data, a render on a computer graphics processing system can generate a 3D representation of the object in polygonal forms as an approximation of the object. Accordingly, the more curved a 3D object's shape is, the more data is needed to define polygons constituting the object for an accurate approximation. In any event, data defining 3D a geometric model like 3D mesh usually contain many polygons, triangles and other necessary shapes interconnected to one another.

Furthermore, developments in 3D graphics technology have taken 3D meshes defined as static to the next step by providing methods that generate animation for 3D meshes. For example, skeleton-based animation technique has been developed to employ 3D mesh data defining a skeleton (i.e. the skin and a hierarchical set of interconnected bones of a 3D character in a computer game) and as well as data defining movements of the 3D character. As such, this technique, for example, animates the 3D character by moving the bones of the skeleton in an articulated manner. Frame-based animation is another 3D graphics technique that employs data to define 3D meshes and their movements over time. Unlike skeleton-based animation, frame-based animation generates animated 3D meshes through defining movement changes in time, i.e. frame by frame, rather than in space.

For all of the aforementioned 3D graphics techniques, large amount of information to facilitate relevant representation of 3D content on a computer is required. Today, computer games, computer graphical designs, drawings, medical imaging, computer cartoons and the like have increasingly utilized 3D graphics in a combination of various forms described above to represent complex 3D objects on a computer. These objects are often defined with extensive texture information on top of 3D geometry models like meshes that have a tremendous amount of vertex points defining the shape of the 3D objects to the finest degree possible. In the case of animated 3D objects, the amount of graphics data is significantly increased even more for defining movements of the 3D objects. Often, the size of graphics data representing 3D content in a 3D graphics application like a computer game is on an order of several magnitudes larger than graphics data representing conventional 2D content. As a result, problems of large storage needed to store such data on a computer and long transmission time for transmitting such data over computer networks have emerged.

An effective solution to the problems of large storage requirements and long transmission time associated with 3D graphics data is using compression techniques to compress 3D graphics data into smaller size. Various compression methods compressing 3D graphics data have been proposed. For example, variable bit rate (VBR) compression, e.g., using JPEG, JPEG2000, and PNG, etc. has been employed to compress 3D graphics data using a variable compression ratio on a per block level. The advantage of such VBR compression of 3D graphics data is that the VBR compression adapts to data such that every block of the 3D graphics data is compressed according to its own condition using a variable ratio and thereby it compresses the 3D graphics data very efficiently. However, decoding VBR compressed 3D graphics data requires processing at a software level performed on a host central processing unit (CPU). This is because existing specialized hardware graphics subsystem on a computer (e.g. GPU acceleration hardware) currently does not support VBR decoding, and hence software decoders must be employed to decode VBR compressed 3D graphics data. It is generally known that decoding at the CPU level through software decoders is not as efficient as hardware decoding in terms of power consumption due to various overheads associated with execution of software decoders. As a result, decoding VBR compressed 3D graphics data at the CPU level using software decoders consumes a lot of power. This power consumption problem is particularly acute to laptop computers, tablets, smart phones, or other portable devices whose main power source is battery on the go. Another problem associated with software decoding of VBR compressed 3D graphics data is the extra data path between a CPU and GPU, where 3D graphics data as decompressed by software decoders must be transferred from CPU to GPU for further processing. This creates extra data path from the CPU to GPU compared to when graphics data is directly loaded into GPU for processing without being decoded at CPU level. In view of 3D graphics data typically having large data size after decompressed by the CPU, this adds another source of power consumption and transmission delay.

As an improvement, GPU friendly compression like the DXTn standards have been developed to facilitate faster and more efficient of processing of 3D graphics data at the GPU level. DXTn eliminates the data path between a CPU and GPU by enabling the GPU to directly process compressed 3D graphics data, known as "on-the-fly" processing in the art. The most recent DXTn standard is DXT5 and it can compress each 4×4 RGBA block to 128 bits for a 4:1 compression ratio. Accordingly, compression using DXT5 and as well as other DXTn standards is fix bit rate compression methods in that it invariably compresses each 4×4 block of graphics data with the same 4:1 compression ratio. As a result, while improving over software decoders in terms of efficient processing and relatively low power consumption, DXTn compression, as a fix bit rate compression method, inevitably contains some blocks that are over-compressed leading to artifacts while some other blocks are under-compressed.

As an improvement directed towards the under-compression problem of DXTn, further encoding DXT compressed 3D graphics data using entropy encoding. Entropy encoding is a well known encoding method that basically replaces each source symbol with the smallest number of bits (i.e. entropy). However, entropy encoded data can also only be decoded at software level on a CPU. Accordingly, the afro-mentioned problems of power consumption and transmission delay at CPU level are also associated with entropy encoding of DXT formatted 3D graphics data.

Recent efforts in graphics processing have focused on developing specialized hardware to enable a GPU to accelerate video decoding or encoding. For example, existing specialized GPU video acceleration hardware implements video codecs, such as H.264, with blocks of circuitry logic and thereby encode/decode data of video more efficiently by off-loading such operations from the CPU to GPU to achieve accelerated video encoding and decoding. One of corollary benefits associated with hardware accelerated video encoding/decoding, compared to software video decoder/encoder running the CPU, is that significant power consumption is saved since the specialized acceleration hardware encodes and decodes videos more efficiently without incurring typical overheads unavoidably associated with software video decoder/encoder when executed on the CPU. Another benefit of hardware video acceleration is reduction of bandwidth by skipping the CPU processing of the video entirely—i.e. the video is directly loaded onto the GPU for processing without being loaded to the CPU and then from the CPU to the GPU. However, video acceleration hardware is not designed to process 3D graphics data since 3D graphics data does not define video. Accordingly, the efficiency of existing GPU video acceleration hardware has not been applied to the processing of 3D graphics data.

Therefore, for one or more above-mentioned problems, there exists a need for a method and apparatus for enhanced processing of 3D graphics data.

BRIEF DESCRIPTION OF THE DRAWINGS

The invention will be more readily understood in view of the following description when accompanied by the below figures, wherein like reference numerals represent like elements.

DETAILED DESCRIPTION

Figure 1:
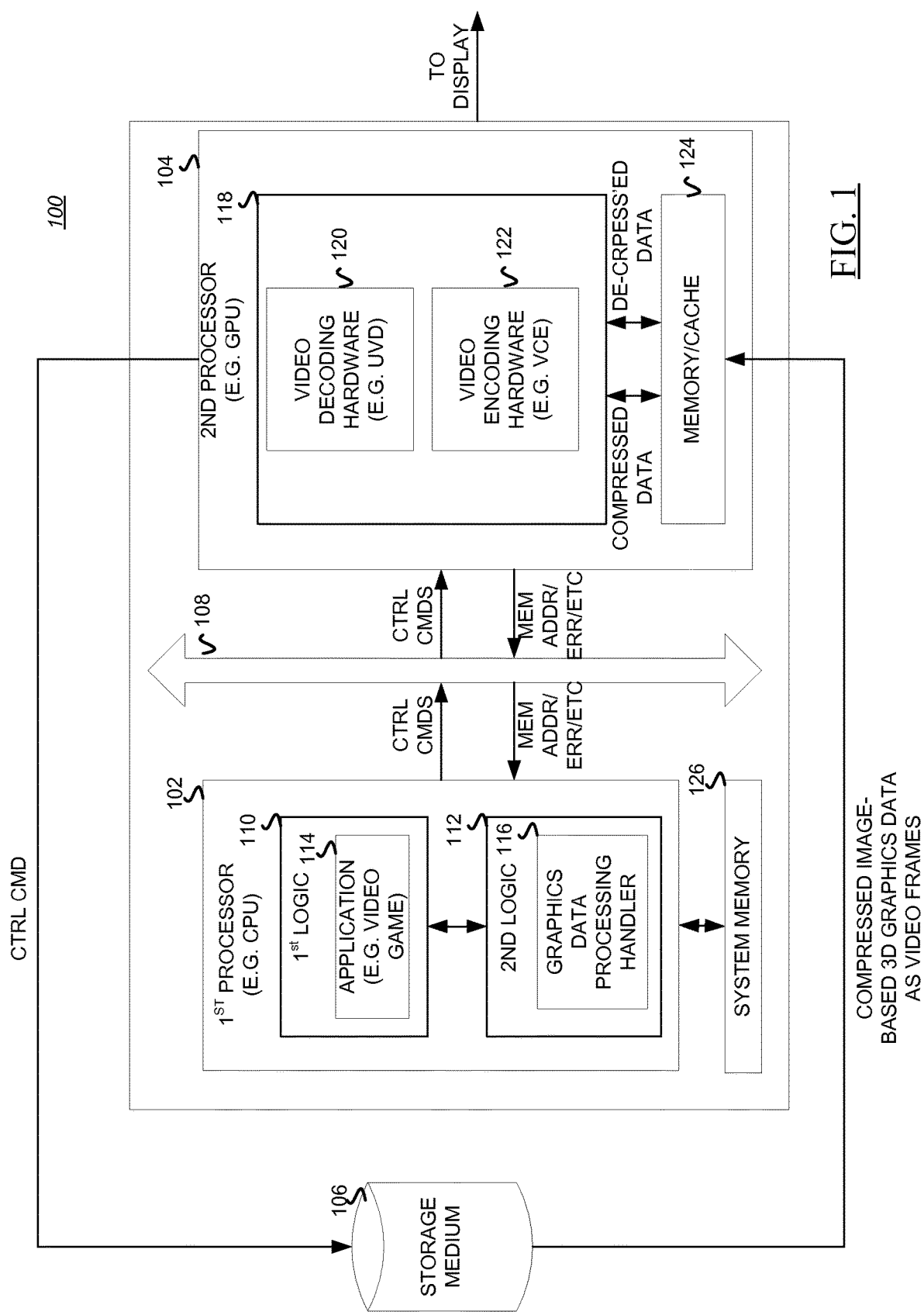
FIG. 1 is a block diagram illustrating one example of an apparatus for providing enhanced processing of 3D graphics data in accordance with one embodiment set forth in the disclosure.

Briefly, in one example, a method and apparatus for processing 3D graphics data compresses 3D graphics data as one or more frames contained in one or more videos, and decompresses the compressed 3D graphics data using video acceleration hardware provided by a graphics processing unit (GPU), wherein the 3D graphics data forms one or more images. 3D graphics data that defines 3D effects through image maps, such as texture maps, normal maps, displacement maps, etc, for the underlying images form images by itself (e.g. raster images). The method and apparatus associates 3D objects defined by the 3D graphics data with video frames comprising the compressed 3D graphics data. The method and apparatus compresses the image-based 3D graphics data as one or more video frames contained in one or more videos. The 3D graphics data so compressed can be decompressed using video acceleration hardware, i.e. hardware operative to accelerate video decoding and/or encoding, provided by the GPU.

Among other advantages, for example, the method and apparatus provides an enhanced processing of image-based 3D graphics data by allowing the video acceleration hardware provided by the GPU to efficiently decompress the compressed image-based 3D graphics data at the GPU level. In contrast to compressing image-based 3D graphics data using encoding format such as JPEG, JPEG2000, or PNG, and decompressing the compressed data using software decoders running on a CPU, the method and apparatus compresses image-based 3D graphics data as video frames and decompresses video frames comprising the compressed image-based 3D graphics data using video acceleration hardware to leverage the efficiency provided by the video acceleration hardware. In so doing, the method and apparatus provides comparable compression gain (i.e. data size reduction), better decompression performance, lower power consumption and less transmission delay than the approach employing software decoder to decompress compressed 3D graphics data at the CPU level.

The method and apparatus may associate 3D objects, e.g. 3D effects such as texture, displacement, bumps, normals, etc, defined image-based 3D graphics data with video frames comprising the image-based 3D graphics data in compressed state. Such association may be used to decompress the compressed image-based 3D graphics data. For example, a video having one or more frames comprising particular compressed image-based 3D graphics data can be decompressed based on such association to obtain 3D objects corresponding to the compressed 3D graphics data for further processing, e.g., by a shader on the GPU.

To obtain a particular 3D object compressed in a corresponding video frame, the method and apparatus may decompress a video having the video frame. Alternatively, for better decompression and access performance, the method and apparatus may compress image-based 3D graphics data as one or more frames not dependent on each other for rendering. For example, the H.264 video encoding specification provides independent frames called intra-frames. Images formed by image-based 3D graphics data, such as texture, displacement, normal maps, etc, may be compressed using a software or hardware H.264 encoder as intra-frames independent on each other. In one example, the method and apparatus compresses the image-based 3D graphics data as one or more H.264 intra-frames. Since H.264 intra-frames do not depend on each other when compressed—i.e. H.264 intra-frames are compressed not subject to temporal relationships among related frames as known in the art, H.264 intra-frame may be randomly accessed when decompressed by video acceleration hardware, such as Universal Video Decoder™ (UVD) provided by Advanced Micro Device, Inc (AMD), One AMD Place, Santa Clara, Calif., or any suitable video processing hardware. For example, the apparatus and method may decompress any infra-frame to obtain the corresponding 3D object without having to decompress the entire video and reconstruct that frame based on temporal relationships among frames within the video.

The method and apparatus may also selectively cache image-based 3D graphics data. In one example, the method and apparatus may compress the to-be-cached image-based 3D graphics data as one or more video frames. The method and apparatus may instruct video acceleration hardware provided by the GPU to so compress. In response to successful compression the image-based 3D graphics data, the method and apparatus may instruct the compressed image-based 3D graphics data to be cached on the GPU's memory. In one example, the method and apparatus may update one or more cache tables with information indicating association between 3D objects defined by the compressed image-based 3D graphics data, which has been cached, and one or more corresponding video frames comprising the compressed image-based 3D graphics data.

In one example, the method and apparatus may also determine whether the video acceleration hardware can decompress the compressed image-based 3D graphics data. Upon a determination that the video acceleration hardware can compress the compressed image-based 3D graphics data, the method and apparatus may decompress the compressed image-based 3D graphics data using the video acceleration hardware provided the GPU.

Also among other advantages, the method and apparatus can reduce data size of selected to-be-cached 3D graphics data by compress image-based 3D graphics using video acceleration hardware without resorting to CPU level encoding. As a result of compressing image-based 3D graphics data before caching the data on the GPU, improvement is gained in terms increased cache capacity using the same amount of cache space. Accordingly, the proposed techniques can improve performance of processing 3D graphics data by providing a more efficient way to caching image-based 3D graphics data. Other advantages will be recognized by those of ordinary skill in the art.

FIG. 1 illustrates one example of an apparatus 100 operative to process 3D graphics data. The apparatus 100 may be any suitable device, for example, a video game console, laptop computer, desktop computer, media center, a set top box, television, handheld device (e.g. mobile or smart phone, tablet), or any other suitable device that can process graphics data, to name a few. In this example, the apparatus 100 employs a first processor 102 such as a CPU, operatively connected to a system memory 126, a second processor 104 such as a GPU, and data buses or point to point connections, such as system bus 108, which transfer data between each structure of the apparatus 100. As shown, the apparatus 100 may also include storage medium 106, for example, such as one or more hard disks, dynamic memories (DRAM), flash memories, network storage, optical drives (e.g., CD or DVD drives), just to name a few. Any other suitable structure, such as but not limited to a controller or a display, may also be included in the apparatus 100.

In this example, the first processor 102 is a host central unit (CPU) having multiple cores however any suitable processor may be employed including a DSP, APU, GPGPU or any other suitable processor or logical circuitry. The CPU 102 is bi-directionally connected to other components of the apparatus 100 via the system bus 108 as generally known in the art. The second processor 104 may be a graphics processing unit (GPU) such as one or more GPU cores, GPU integrated circuits, GPU chips or other suitable GPU structure, which drives a display device via a display connector (not shown in this example), such as analog display connectors, for example, composite video, S-Video, VGA, digital display connectors, for example, HDMI, mini-DVI, micro-DVI, wireless connectors or any other suitable connectors. It is understood that, in some other examples of apparatus 100, the first processor (e.g., CPU) 102 may be integrated with the second processor 104 to form a general processor (e.g., APU, accelerated processing unit; GPGPU, general purpose computing on GPU). In addition, although the system memory 106 and the GPU memory 124 are shown in FIG. 1 as discrete memory devices, it is also understood that a unified memory architecture that can accommodate all the processors may also be employed in some other examples of apparatus 100.

In this example, as shown, a first processor 102 employs first logic 110 having one or more Applications 114 such as video games, second logic 116 having a graphics data processing handler. The logic 110 and 112 referred to herein is any suitable executing software module, hardware, executing firmware or any suitable combination thereof that can perform the desired function, such as programmed processors, discrete logic, for example, state machine, to name a few. It is further understood that the logic 110 and 112 may be included in the first processor 102 as part of the first processor 102, or a discrete component of the apparatus 100 that can be executed by the first processor 102, such as software programs stored on computer readable storage medium that can be loaded into the apparatus 100 and executed by the CPU 102. It is also understood that the logic 110 and 112 may be combined in some other examples to form an integrated logic that performs desired functions of the logic 110 and 112 as described herein.

In this example, the GPU 104 employs video acceleration hardware 118 operatively connected to the GPU memory 124. As shown, the video acceleration hardware 118 includes video decoding hardware 120 such as the Universal Video Decoder™ (UVD™) provided by Advanced Micro Devices, Inc and video encoding hardware 122 such as the video codec engine provided by AMD. Although only one block of video decoding hardware and one block video encoding hardware are shown in this example, it is understood that the number of blocks of video decoding and encoding hardware the video acceleration hardware 118 may include can vary in some other examples. It is further understood, although the video decoding hardware 120 and video encoding hardware are shown as discrete components in this example, they may be combined to form an integrated decoding/encoding unit within video acceleration hardware in a GPU.

Figure 2:
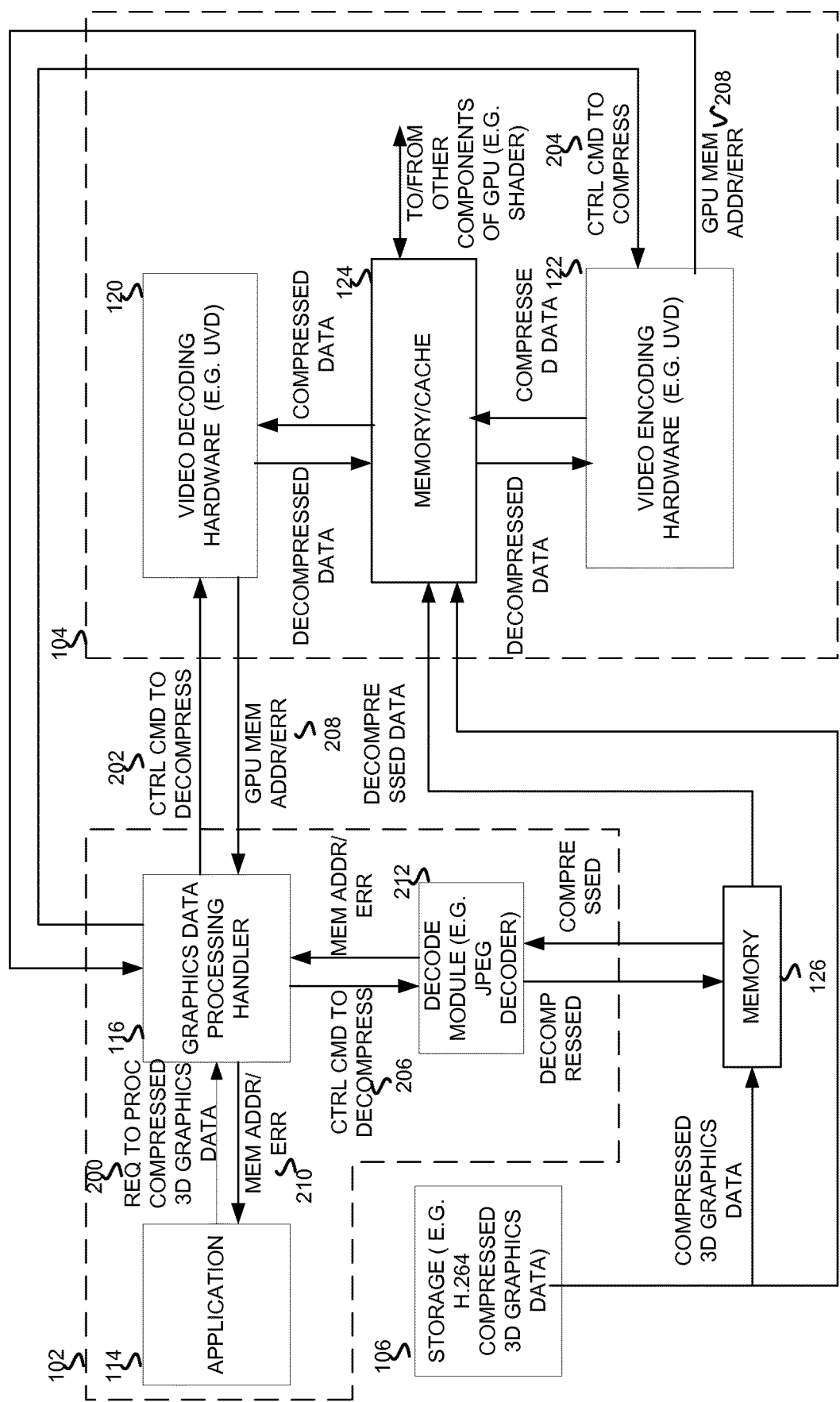
FIG. 2 is a block diagram illustrating further details of the apparatus for providing enhanced processing of 3D graphics data as shown in FIG. 1.

FIG. 2 further illustrates the exemplary apparatus 100 as described in FIG. 1. The apparatus 100 includes a CPU 102 operatively connected to system memory 126, and a GPU 104, operatively connected to the CPU 102 and other components of 100 via the system bus 108 (not shown in FIG. 2). The apparatus 100 also includes the storage medium 106 in this example. As described in FIG. 1, the storage medium 106 may be one or more hard disks, dynamic memories (DRAM), flash memories, network storage, optical drives (e.g., CD or DVD drives) or any other storage medium known in the art as suitable to store 3D graphics data.

In this example, the Application 114 and graphics data processing handler 116 may be software executed in the logic 110 and 112 respectively running on the CPU 102. The Application 114, e.g., a video game, employs 3D graphics data for display. In accordance with one embodiment of the present disclosure, developers of Application 114 may compress the 3D graphics data as video frames and store them on the storage medium 106. Such compression will be described in FIG. 4 and FIG. 5 in further details. As shown, the Application 114 may generate a request 200 to process the compressed 3D graphics data, e.g. to decompress the compressed 3D graphics data for rendering. Through the request 200, the Application 114 may inform the location on the storage medium 106 where the requested compressed 3D graphics data is stored.

In this example, the request 200 generated by the Application 114 is received by the graphics data processing handler 116. The graphics data processing handler 116, among other things, is operative to determine whether the GPU decoding hardware can decompress the requested 3D graphics data for further processing of the 3D graphics data. In cases when the graphics data processing handler 116 determines that the GPU decoding hardware can decompress the 3D graphics data—i.e. the video decoding hardware 120 can decode the video frames in which the 3D graphics data was compressed by developers of Application 114 during the development phase of the Application 114, the graphics data processing handler 116 generates a control command 202 instructing the video decoding hardware 120 to decompress one or more videos comprising the compressed 3D graphics data. In those cases, the graphics data processing handler 116 may also instruct the GPU, e.g., by the same control command 202 or a separate control command, to load the video having frames comprising the compressed 3D graphics data from the storage medium 106 into the GPU memory 124. For example, the graphics data processing handler 116 may simply pass along the information indicating the storage location of the video files comprising the compressed 3D graphics data to the GPU, and the GPU may use this information to load the requested compressed 3D graphics data into the GPU memory 124 through, e.g., a direct memory access controller (DMA—not shown in FIG. 2).

In cases when the graphics data processing handler 116 determines that GPU's video decoding hardware cannot decompress the requested 3D graphics data, e.g., the data is compressed using JPEG2000 encoding format, the graphics data processing handler 116 may determine whether software decoder running on the CPU capable of decompressing the requested 3D graphics data exists in apparatus 100. If the graphics data processing handler 116 determines that a software decoder, e.g., the decode module 212 as shown in this example, can decompress the compressed 3D graphics data, the graphics data processing handler 116 generates a control command 206 instructing the decode module 212 to decompress the 3D graphics data. In those cases, the graphics data processing handler 116 may also generate another control command to load the compressed 3D graphics data, e.g., through a data access module (not shown in FIG. 2) running on the CPU 102.

Upon completion of the decompression of the compressed 3D graphics data, either by the GPU video decode hardware 120 or the CPU decode module 212, the graphics data processing handler 116 is further operative to obtain the memory addresses 210, e.g., the GPU memory addresses 208 where the decompressed 3D graphics data was made available by the GPU video decoding hardware 120 or the system memory addresses where the CPU decode module

212 made such data available. The graphics data processing handler 116 may pass such memory addresses to the Application 114. In cases when errors occurred during the decompression either by the hardware or the software decoder, the graphics data processing handler 116 may also pass messages indicating such errors to the Application 114.

In this example, the graphics data processing handler 116 is further operative to selectively control caching of 3D graphics data. Such a selection may be based on the request 200 generated by the Application 114. For example, the Application 114 requests the 3D graphics data processing handler 116 to cache 3D graphics data in the GPU memory 124 for further processing and inform the location where the 3D graphics data may be found, e.g., from an output of a shader on the GPU, or from the storage medium 106, etc. The graphics data processing handler 116 may also determine such caching is needed based on one or more predetermined caching policies. In any event, to cache the 3D graphics data, the graphics data processing handler 116 determines to compress the 3D graphics data based on the GPU's acceleration hardware's capability. In cases when 3D graphics data processing handler 116 (e.g. through the cache control module 604) determines that the GPU acceleration hardware, such as the acceleration hardware 118, can compress the 3D graphics data, e.g., as one or more video frames, the 3D graphics data processing handler 116 generates a control command 204 instructing the video encoding hardware 122 to compress the decompressed 3D graphics data and store the compressed 3D graphics data in the GPU memory. Further details of the 3D graphics data caching are described in FIGS. 8-11.

Figure 3:
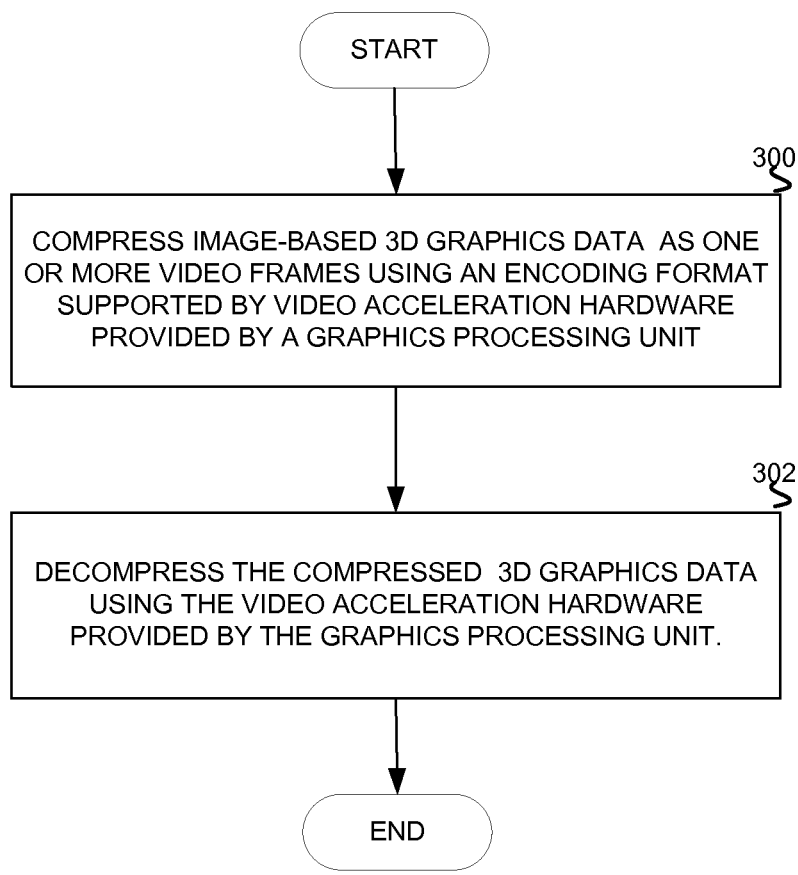
FIG. 3 is a flowchart illustrating one example of a method for providing enhanced processing of 3D graphics data in accordance with one embodiment set forth in the disclosure.
Figure 4:
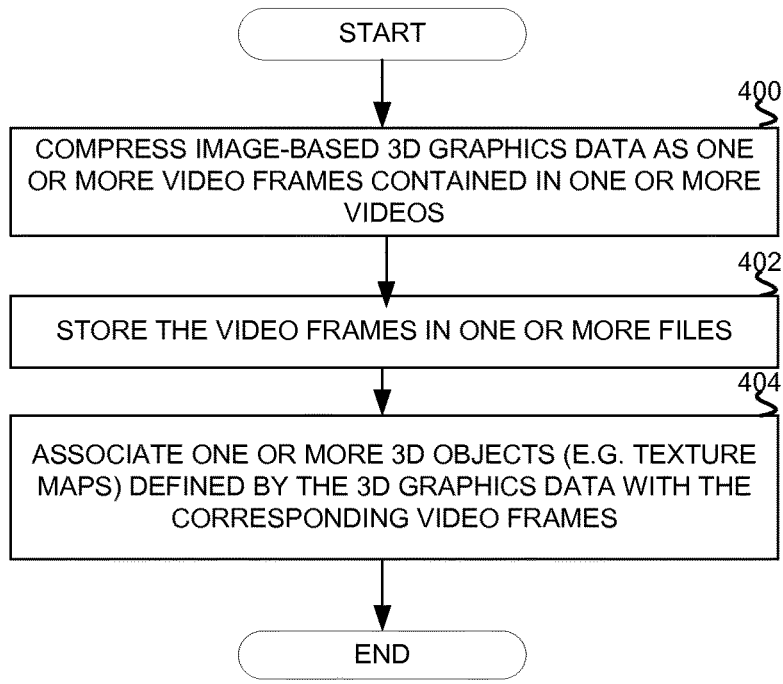
FIG. 4 is a flowchart illustrating another example of the method for providing enhanced processing of 3D graphics data.
Figure 5:
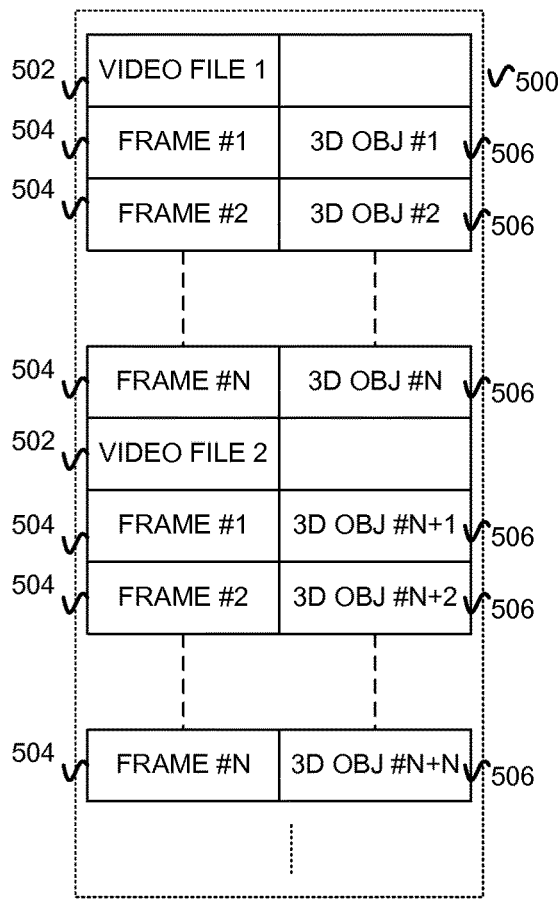
FIG. 5 is an illustration of one example of association among video files, video frames and 3D objects in accordance with one embodiment set forth in the disclosure.

FIG. 3 illustrates one example a method for processing 3D graphics data in accordance with one embodiment of the disclosure. In operation, at block 300, the method compresses 3D graphics data as one or more video frames using an encoding format supported by video acceleration hardware provided by a GPU. For example, the 3D graphics data may be compressed as one or more intra-frames of one or more H.264 formatted videos. This may be done either by a software encoder, e.g. a H.264 encoder, or GPU hardware video encoder such as the video encoding hardware 122 as illustrated in FIGS. 1 and 2. FIGS. 4-5 describe an example of the compression as illustrated by block 300 in further details. In operation, at block 302, the method decompresses the compressed 3D graphics data, e.g. H.264 formatted videos, using the video acceleration hardware provided by the GPU, e.g. the video decoding hardware 120. Details of block 302 are further described in FIGS. 6-7.

FIG. 4 illustrates one example of compressing image-based 3D graphics data as one or more video frames in accordance with one embodiment of the disclosure. It will be described with reference to FIGS. 1 and 2. At block 400, image-based 3D graphics data is compressed as one or more frames contained in one or more videos. As described above, image-based 3D graphics data, such as texture maps, normal maps, displacement maps and the like, forms one or more images. These images can be compressed as frames using an encoding format supported by the video acceleration hardware to take advantage of the efficiency provided by the video acceleration hardware on a GPU. For example, to achieve improved compression and performance gain, the images comprising texture maps normal maps, and displacement maps, etc may be compressed as one or more intra-frames using a H.264 software encoder as generally known in the art.

At block 402, the video frames are stored in or more files. For example, the video frames comprising the compressed image-based 3D graphics data may be divided into one or more files, or "videos", that may be stored on storage medium such as the storage medium 106. In one embodiment, each of such frames may form a separate file. In another embodiment, all of such frames may form only one file. At block 404, the image-based 3D objects defined by the 3D graphics data is associated with corresponding video frames. FIG. 5 illustrates one example of such an association. Table 500 comprises information indicating associations between 3D graphics objects 506, e.g., texture maps, displacement maps or normal maps, defined by the image-based 3D graphics data and the corresponding frames 504 comprising the compressed image-based 3D graphics data, i.e. at block 400. In this example, such information is further organized by the video files 502 comprising video frames. The table 500 may be stored in a file located on a storage medium such the storage medium 106. The table 500 may also be stored in system memory during operation of apparatus 100 as described in FIG. 6.

Figure 6:
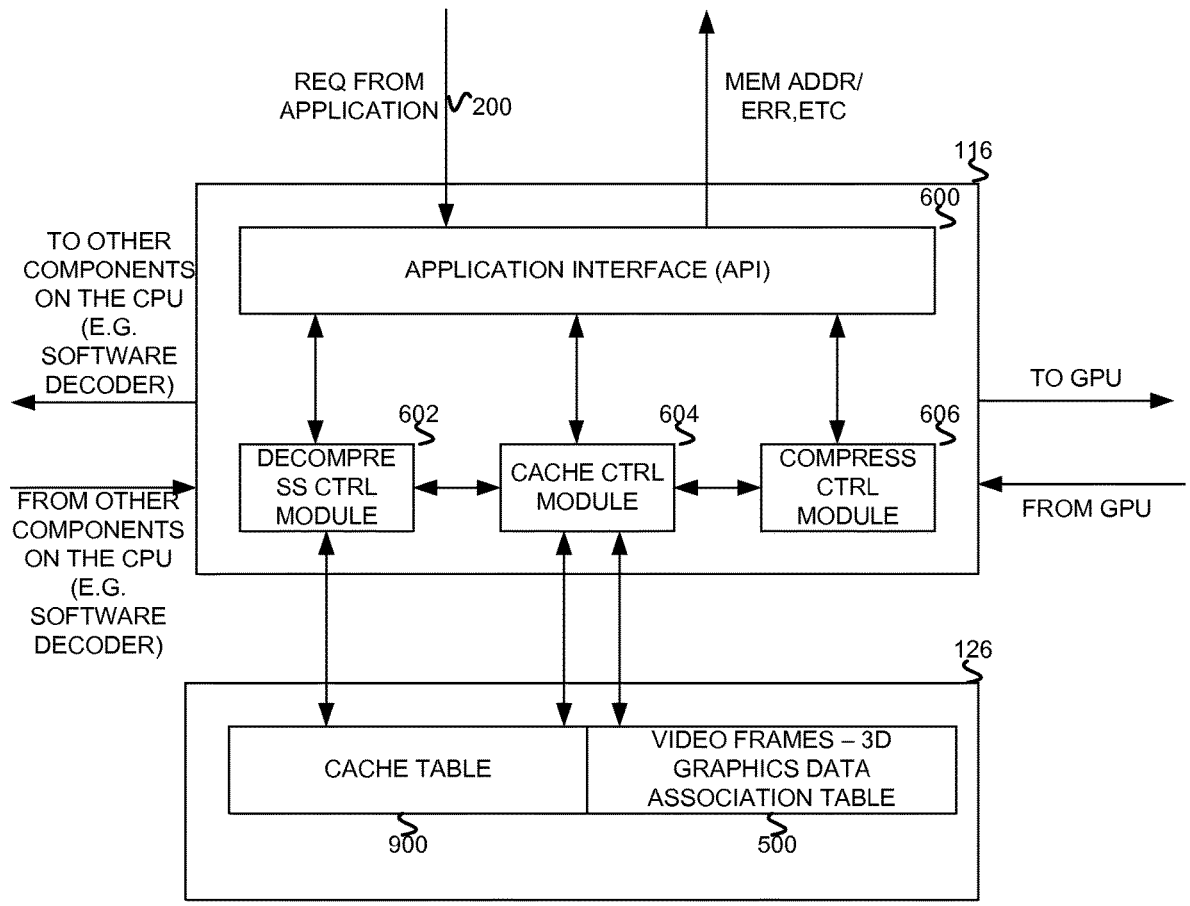
FIG. 6 is a block diagram illustrating another example of an apparatus for providing enhanced processing of 3D graphics data in accordance with one embodiment set forth in the disclosure.

FIG. 6 illustrates further details of the 3D graphics handler 116 as shown in FIGS. 1 and 2. It is understood that the illustration shown in FIG. 6 is one example of the 3D graphics handler 116 and the 3D graphics handler 116 may have components different from those illustrated in FIG. 6 in accordance with the disclosure in some other examples. In this example, the 3D graphics handler 116 comprises an application interface (API) 600 operatively connected to a cache control module 604, compress control module 606, and decompress control module of 602 via suitable communication channels. The 3D graphics handler 116 is also operatively connected to a GPU, such as the GPU 104 (not shown in this example) via a system bus, such as the system bus 108. Furthermore, as shown, the 3D graphics handler 116 is also operatively connected to other components on the CPU, for example, such as the decode module 212.

As shown, the API 600 is operative to interface with, for example, Application 114, to receive one or more requests to process 3D graphics data, for example, the request 200 as shown in FIG. 2. The API 600, in this example, is also operative to return information indicating memory addresses where the processed 3D graphics data is made available to the requester, e.g., the Application 114. The API 600 may also be operative to return one or more error messages indicating the requested 3D graphics data cannot be processed. One having ordinary skill in the art will recognize other data may be received or returned by the API 600 as generally known in the art.

In this example, the decompress module 602 is operatively connected to the API 600 and the cache control module 604. In an event that the Application Request such as the request 200 indicates that the requested 3D graphics data is compressed and needs to be decompressed, the decompress module 602 is operative to determine how to decompress the requested 3D graphics data. For example, the decompress module may consult with the cache control module 604 and the cache table 900 in the system memory 126 as shown to determine if the requested 3D graphics data has been cached. The decompress module 602 is also operative to determine whether the acceleration hardware provided by the GPU, e.g. the video decoding hardware 120, may decompress the 3D graphics data. In cases when decompress module 602 determines the compressed 3D graphics data can be decompressed by the video decoding hardware provided by the GPU, the decompress module 602 is further operative to generate one or more control commands instructing the video decoding hardware 120 to decompress the requested 3D graphics data, such as the control command 202 as shown in FIG. 2. The decompress module 602 is further operative to determine whether a decoder provided by the CPU, such as the decode module 211, may decompress the requested 3D graphics data. In cases when decompress module 602 determines that a decoder provided the CPU may decompress the 3D graphics data, the decompress module 602 may generate one more control commands, such as the control command 206, instructing the selected CPU decoder to decompress the requested 3D graphics data. Further details of the decompress control module 602 are described in FIG. 7.

In this example, the cache control module 604 is operatively connected to the API 600, the decompress control module 602, and compress control module 606. In an event that the Application Request such as the request 200 indicates that the requested 3D graphics data is to be cached in the GPU memory (e.g., the request 200 includes a cache request) the cache control module 604 is operative to determine how to cache the requested 3D graphics data. In cases when the requested to be cached 3D graphics data is already compressed with an encoding format supported by the video acceleration hardware provided by the GPU; e.g., the requested 3D graphics data is compressed as intra-frames of one or more H.264 formatted videos, the cache control module 604 is operative to generate a control command instructing the GPU to store the requested 3D graphics data in the GPU's memory. In those cases, the cache control module 604 is further operative to update the cache table 900, for example, stored in the system memory 126 as shown. The request 200 may also indicate that processed 3D graphics data, in a decompressed state, is to be cached on the GPU memory for further processing. For example, the request 200 may indicate to process the 3D graphics data using a shader unit on the GPU and cache the processed 3D graphics data in the GPU memory 122 for further processing. In those cases, the cache control module 604 is operative to determine whether the to be cached 3D graphics data can be compressed by video acceleration hardware provided by the GPU, e.g. the video encoding hardware 122. If the cache control module 604 determines that the video encoding hardware provided by the GPU can compress the requested to be cached 3D graphics data, the cache control module 604 is further operative to generate one or more control commands, such as the control command 208, instructing the video encoding hardware to compress the 3D graphics data and store the compressed 3D graphics data in the GPU memory. For example, the cache control module 604 may issue a control command to instruct the video encoding hardware 122 to compress the 3D graphics data as H.264 intra-frames. FIGS. 8-11 describe further details of the caching operation in accordance with the disclosure.

Figure 7:
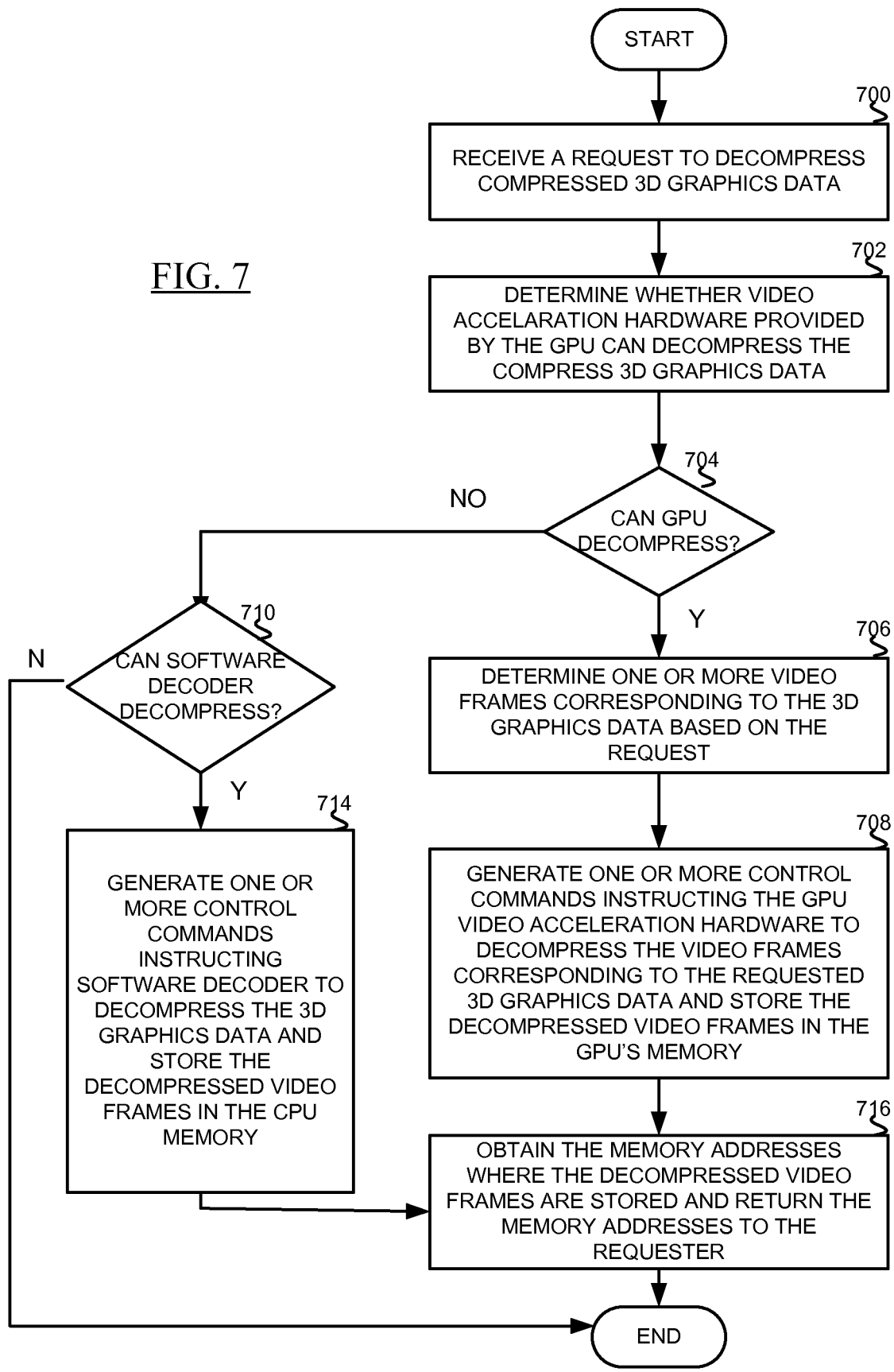
FIG. 7 is a flowchart illustrating still another example of the method for providing enhanced processing of 3D graphics data.

FIG. 7 illustrates one example of a method for processing 3D graphics data in accordance with one embodiment of the disclosure. In operation, at block 700, a request to decompress 3D graphics data is received by the 3D graphics data handler 116. Such a request may be from an Application 114, such as a video game, to decompress compressed 3D graphics data employed by the Application 114. For example, the video game may employ one or more texture maps, which are stored on storage medium such as the storage medium 106. At operation, to render the compressed 3D graphics data, the video game may request the 3D graphics data handler 116 to decompress the compressed 3D graphics data and make them available in the GPU's memory. In another example, such a request may be from another component running on the CPU such as a computational module. The computational module may be configured to manipulate the texture maps stored on the storage medium 106 in a compressed state. In order to manipulate the texture maps, the computational module may first generate a request instructing the 3D graphics handler 116 to decompress the texture maps and make them available in the GPU's memory.

In operation, at block 702, the module 3D graphics data handler 116, determines whether video acceleration hardware provided by the GPU can decompress the compressed 3D graphics data requested. The 3D graphics data handler 116 may generate queries to the GPU for information indicating its capabilities of decompression. The 3D graphics data handler may also be pre-configured with information regarding the capability of the video acceleration hardware it is associated with. In those cases, such information may be stored in system memory such as the system memory 126 and the 3D graphics data handler 116 may make a determination by querying the system memory 126 for the information. In one example, the 3D graphics data handler 116 determines that the compressed 3D graphics data was compressed in an H.264 encoding format as intra-frames based on information received from the requester; further details of decompressing H.264 formatted 3D graphics data in intra-frames are described in FIG. 12. The 3D graphics data handler 116 also obtains information indicating the GPU acceleration hardware's capability, e.g. either from the GPU or the system memory 126 and determines whether the GPU acceleration hardware can decompress the requested 3D graphics data. In some examples, the operation described in block 700 may be performed by the decompress control module 602 within the 3D graphics handler 116.

At block 704, in operation, the 3D graphics handler 116 recognizes whether the acceleration hardware provide by the GPU, e.g. the video decoding hardware 120, can decompress the requested compressed 3D graphics data. In cases when the 3D graphics handler 116 recognizes that the GPU acceleration hardware can decompress the compressed 3D graphics data, the processing proceeds to block 706. In operation, at block 706, the 3D graphics handler 116 further determines one or more video frames corresponding to the requested 3D graphics data. For example, the request received by the 3D graphics data handler 116 may include information indicating one or more video frames in video files located on the storage medium 106 corresponding to the requested 3D graphics data. This information may be generated from the video frame-3D graphics data association table 500 stored in the system memory 126 by the requester, e.g. the Application 114. Alternatively, the Application 114 may be configured with the information indicating the video frame-3D graphics data association table 500. In any event, the Application 114 looks up in the table 500 for the video files and frames associated with the 3D objects, e.g. texture maps, and include that information in a request to the 3D graphics handler 116. For example, the Application 114 such as a video game may request 3 texture maps compressed and stored on the storage medium 106 to be decompressed for rendering. The Application 114 may look up the table 500 stored in system memory 106 and determines that texture map #1 corresponding to frame #5 in video file 1, texture map #2 corresponding to frame #13 in video file 2, and texture map #3 corresponding to frame #7 in video file 3. The Application 114 includes this information in a request to the 3D graphics data handler 116 to decompress these frames. Furthermore, the 3D graphics data handler 116 may also be configured to look up the table 500 stored in the system memory 126. In those cases, the Application 114 may simply instruct the 3D graphics data handler 116 to decompress the 3 texture maps as described above and obtain the information indicating the video frames and files corresponding to the 3 texture maps from the table 500.

In operation, at block 708, the 3D graphics handler 116 generates one or more control commands instructing the GPU video acceleration hardware to decompress the video frames corresponding to the requested 3D graphics data. For example, the 3D graphics handler 116 through the decompress control module 602 may generate a control command 208 instructing the video decoding hardware 120 provided by the GPU 104 to decompress the 3 texture maps. Such a command may include information indicating the location of the video files comprising these text maps, e.g. addresses on the storage medium 106 where the video files are located. The control command 202 may also include information indicating the frames to be decompressed within the video files, e.g., frame #5 in video file 1, frame #13 in video file 2, and frame #7 in video file 3. In some examples, the 3D graphics data handler 116 may be configured to instruct all frames within the video files requested to be decompressed by the video acceleration hardware and cache them in the GPU memory. Caching technologies based on application usage is well known in the art and such technologies may be built into components of the 3D graphics handler 116, e.g., such as the cache control module 604. In this example, the decompress control module 602 also generates a control command instructing the GPU to store the decompressed video frames in the GPU's memory.

Refer back to block 704. In cases when the 3D graphics data handler 116 recognizes that the GPU acceleration hardware cannot decompress the requested 3D graphics data, the processing proceeds to block 710. In operation, at block 710, the 3D graphics data handler 116 further recognizes whether the requested 3D graphics data may be decompressed by a decoder running on the CPU. In cases when the 3D graphics data handler 116 recognizes that the 3D graphics data cannot be decompressed by any decoder running on the CPU, the processing ends. In cases when the 3D graphics data handler 116 recognizes that the 3D graphics data can be decompressed by a decoder running on the CPU, such as the decode module 212, the processing proceeds to block 714. In operation, at block 714, the 3D graphics data handler 116, e.g., through the decompress control module 602 generates one or more control commands, such as the control command 206, instructing decoder running on the CPU, e.g. the decode module 612, to decompress the 3D graphics data. The control command 206 may also include instructions instructing the decode module 212 to store the decompressed 3D graphics data in the system memory, such as the system memory 126.

In operation, at block 716, the 3D graphics data handler 116 obtains the memory addresses where the decompressed video frames are stored and return the memory addresses to the requester. For example, the 3D graphics data handler 116 may receive information packets from GPU acceleration hardware, e.g. the video decoding hardware 120, wherein the packet may include status data indicating, e.g., that the decompression as instructed by a control command 202 generated by the 3D graphics data handler 116 is successful and the decompressed 3D graphics data is stored in the GPU memory. In some other examples, the 3D graphics data handler 116 may receive such information from the decoder running on the CPU. In any event, in response to the status update of the requested decompression, the 3D graphics data handler 116 returns the memory addresses where the decompressed 3D graphics data is made available.

Figure 8:
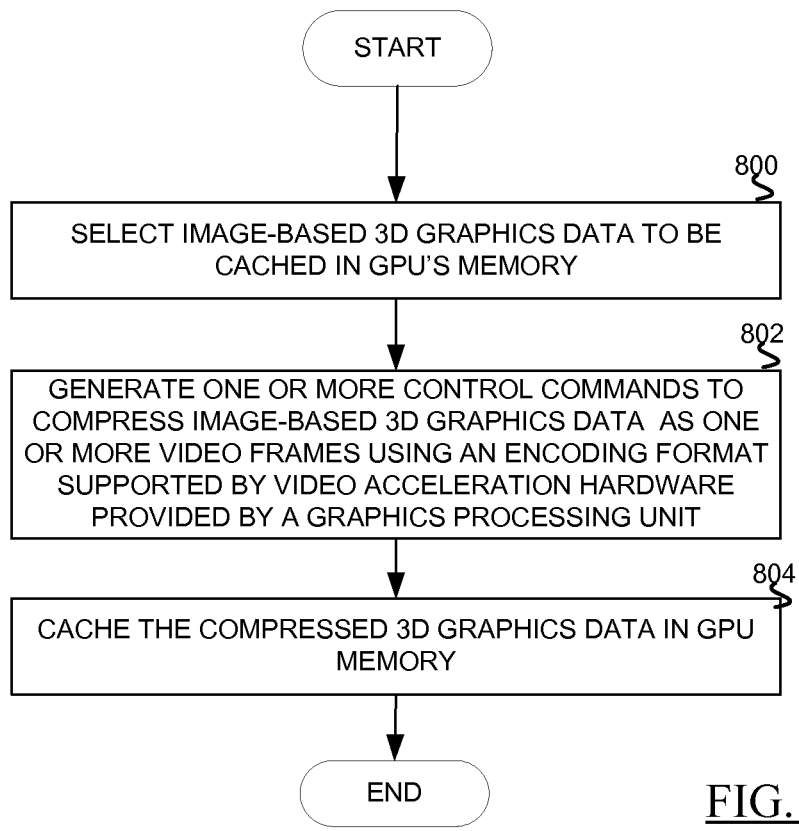
FIG. 8 is a flowchart illustrating yet another example of the method for providing enhanced processing of 3D graphics data.

FIG. 8 illustrates one method for selective caching of image-based 3D graphics data in accordance with the disclosure. In operation, at block 800, the 3D graphics data handler 116, e.g., through the cache control module 604 selects image-based 3D graphics data to be cached in GPU's memory. Caching is a well know technique in the art. The 3D graphics data handler 116 may selectively cache image-based 3D graphics data based on caching policy configured into the 3D graphics data handler. For example, such caching policy may instruct the 3D graphics data handler 116 to cache image-based 3D graphics data in a first in first out (FIFO) fashion in one or more segments of GPU's memory, such as the GPU memory 124, or in a dedicated cache associated with GPU. One having ordinary skill in the art will recognize other caching policies may be used. In some other examples, such a selection may be made by a requester, e.g. the Application 114. In those examples, the Application 114 simply instructs the 3D graphics data handler which 3D graphics data may be cached for further processing.

In operation, at block 802, the 3D graphics data handler 116, in response to a selection of caching of image-based 3D graphics data, generates one more control commands, e.g., the control command 208, to compresses 3D graphics data as one or more video frames using an encoding format supported by video acceleration hardware provided by the GPU. As described earlier, image-based 3D graphics data, such as texture maps, displacement maps or normal maps, can be compressed as frames of one or more videos. For example, the cache control module 604 based on the information indicating the compression capability of the video acceleration hardware determines that the requested image-based 3D graphics data may be compressed into H.264 intra-frames since the video encoding hardware, such as the video encoding hardware 122, can be used to so compress. At block 804, the 3D graphics data handler 116 caches the compressed 3D graphics data in GPU memory. To achieve this, the cache control module 604 of the 3D graphics data handler 116, in one example, may generate a control command instructing the GPU to store the compressed 3D graphics data in the GPU memory.

Figure 9:
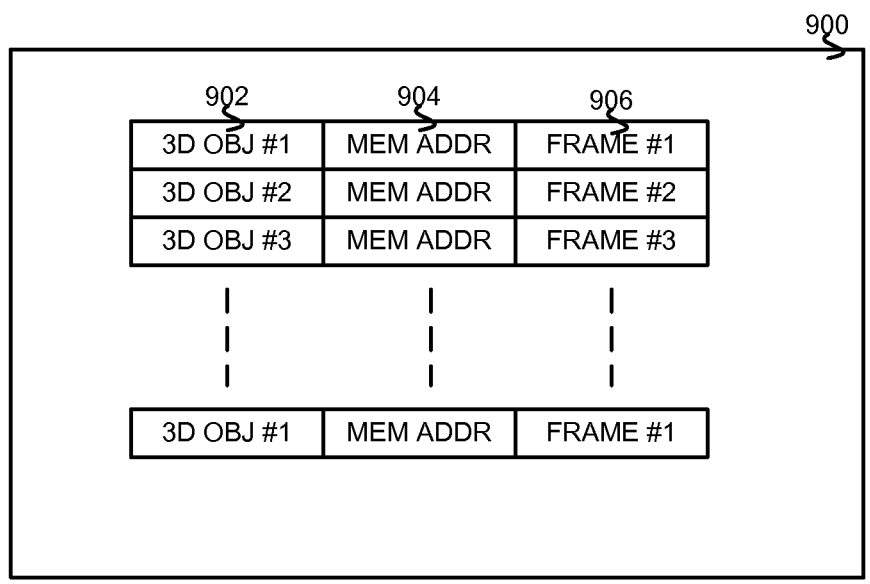
FIG. 9 is an illustration of one example of content of cache table in accordance with one embodiment set forth in the disclosure.

FIG. 9 illustrates one example of cache table 900 that can be employed by the cache control module 604 of the 3D graphics handler 116 for caching requested 3D graphics data in accordance with the disclosure. As shown, the cache table 900 comprises one or more associations among 3D object 902 (e.g. texture maps, normal maps, displacement maps, etc), memory address 904 where the corresponding 3D object is stored on the GPU memory, and the frame 906 corresponding to the 3D object. The table 900 may be updated by the cache control module 604 upon a successful compression and storing of the selected image-based 3D graphics data as described in FIG. 8.

Figure 10:
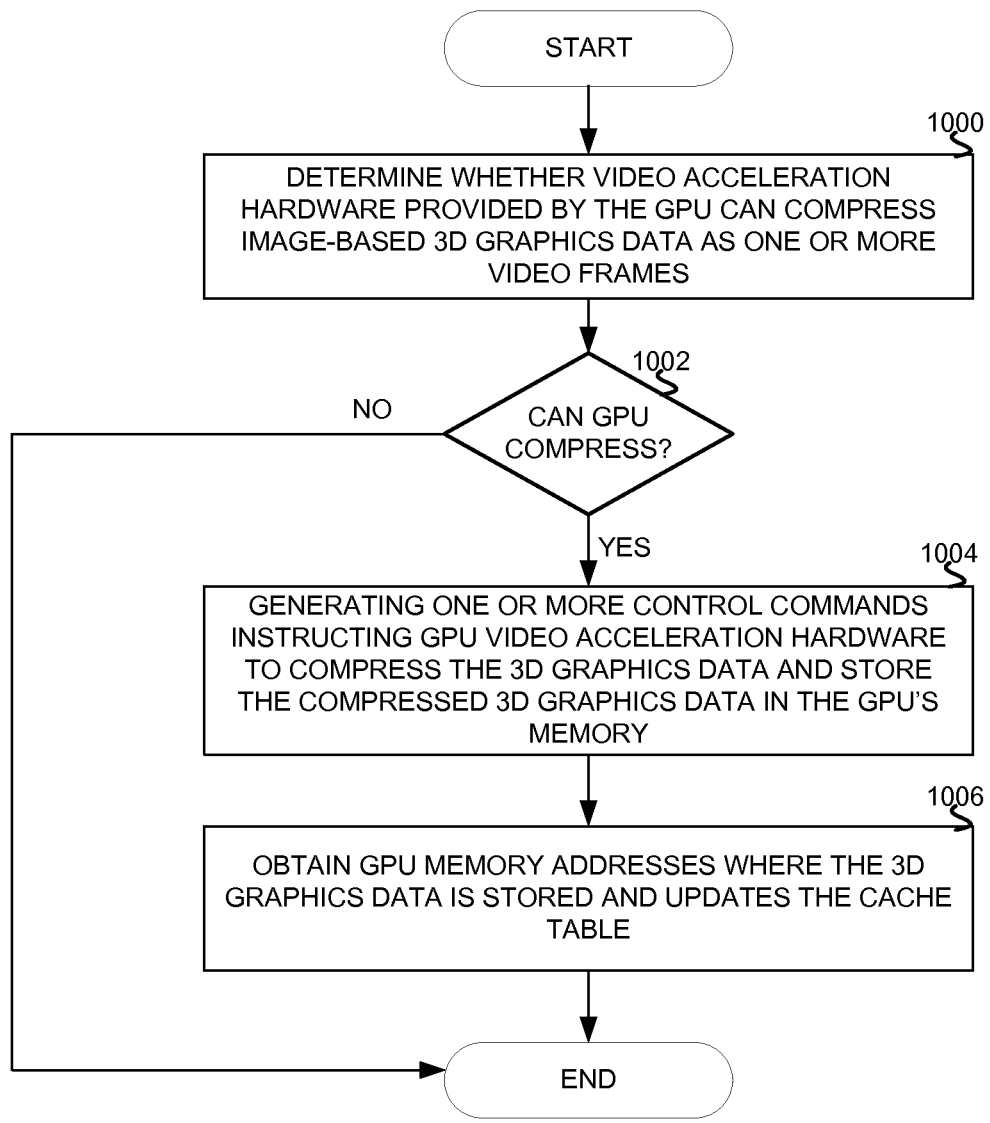
FIG. 10 is a flowchart illustrating still another example of the method for providing enhanced processing of 3D graphics data.

FIG. 10 illustrates further details of block 802 as shown in FIG. 8. In operation, at block 1000, the cache control module 604 employed by the 3D graphics data handler 116 determines whether video acceleration hardware provided by the GPU can compress 3D graphics data as one or more video frames, for example, in response to a selection of caching of the 3D graphics data. For example, the 3D graphics data handler 116 may determine that the 3D graphics data forms one or more images, such as texture maps, normal maps, displacement maps, etc. As described earlier, such image-based 3D graphics data may be compressed as one or more video frames using video encoding hardware provided GPU. At block 1002, the cache control module 604 recognizes whether the GPU video acceleration hardware can compress the to be cached 3D graphics data. In cases when it is recognized that the GPU acceleration hardware cannot so compress, the processing ends as shown. In cases when it is recognized the GPU acceleration hardware can so compress, the processing proceeds to block 1004. In operation, at block 1004, the cache control module 604 generates one more control commands instructing the GPU video acceleration hardware to compress the selected 3D graphics data and store the compressed 3D graphics data in the GPU's memory. In operation, at block 1006, the cache control module 1006 obtains the GPU memory addresses where the 3D graphics data is stored and updates the cache table, such as the cache table 900 as shown in FIG. 9.

As noted above, among other advantages, the method and apparatus provides an enhanced processing of image-based 3D graphics data by allowing the video acceleration hardware provided by the GPU to efficiently decompress the compressed image-based 3D graphics data at GPU level. In contrast to compressing image-based 3D graphics data using encoding format such as JPEG, JPEG2000, PNG, and decompressed the compressed data using software decoder running on a CPU, the method and apparatus compresses image-based 3D graphics data as video frames and decompresses video frames comprising the compressed image-based 3D graphics data using video acceleration hardware to leverage the efficiency provided by the video acceleration hardware. In so doing, the method and apparatus provides comparable compression gain (i.e. data size reduction), better decompression performance, lower power consumption and less transmission delay than the approach employing software decoder to decompress compressed 3D graphics data at CPU level. Furthermore, the method and apparatus can reduce data size of selected to-be-cached 3D graphics data by compress image-based 3D graphics using video acceleration hardware without resorting to CPU level encoding. As a result of compressing image-based 3D graphics data before caching the data on the GPU, improvement is gained in terms increased cache capacity using the same amount of cache space. Accordingly, the proposed techniques can improve performance of processing 3D graphics data by providing a more efficient way to compress the 3D graphics data at GPU level before caching it. Other advantages will be recognized by those of ordinary skill in the art.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims. In addition, unless stated otherwise, terms such as "first" and "second" are used to arbitrarily distinguish between the elements such terms describe. Thus, these terms are not necessarily intended to indicate temporal or other prioritization of such elements. The term coupled, as used herein, is defined as connected, although not necessarily directly, and not necessarily mechanically. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one.

What is claimed is:

1. A method for processing three dimensional (3D) graphics data, the method comprising:
    compressing, using video acceleration hardware of a graphics processing unit (GPU), 3D graphics data as one or more formatted video frames, the 3D graphics data being data able to be processed by a graphics rendering engine of the GPU wherein the 3D graphics data is compressed as video frames that are not dependent on each other for rendering;
    storing association information for 3D objects defined by the 3D graphics data with corresponding video frames comprising the compressed 3D graphics data formatted as video frames for forming at least one video file including the 3D objects and the corresponding video frames comprising the compressed 3D graphics data,
    selectively caching of the compressed 3D graphics data on the GPU by updating one or more cache tables with information indicating the association between 3D objects defined by the cached compressed 3D graphics data and one or more video frames comprising the cached compressed 3D graphics data.

2. The method of claim 1 further comprising:
    decompressing the compressed 3D graphics data using video acceleration hardware provided by the GPU based on the association information in the video file indicating the association between the 3D objects defined by the 3D graphics data and the corresponding video frames comprising the compressed 3D graphics data.

3. The method of claim 2, wherein decompressing the compressed 3D graphics data comprises decompressing one or more videos having one or more frames comprising the compressed 3D graphics data.

4. The method of claim 1, wherein the 3D graphics data is compressed as H.264 intra-frames.

5. The method of claim 1, wherein the compressed 3D graphics data is decompressed by decompressing one or more video frames comprising the compressed 3D graphics data.

6. The method of claim 1, wherein the 3D graphics data defines at least one of the following:
    texture map;
    displacement map; and
    normal map.

7. The method of claim 1 further comprises determine whether the video acceleration hardware can decompress the compressed 3D graphics data, and decompressing the compressed 3D graphics data using video acceleration hardware provided by the GPU, in response to a determination that the video acceleration hardware provided by the GPU can decompress the compressed 3D graphics data.

8. An apparatus operative to process 3D graphics data, the apparatus comprising:
    logic comprising a 3D graphics data processing handler, operatively connected to a graphics processing unit (GPU), operative to:
    instruct video acceleration hardware provided by the GPU to decompress 3D graphics data that is compressed as one or more formatted video frames, the 3D graphics data being data able to be processed by a graphics rendering engine of the GPU wherein the 3D graphics data is compressed as video frames that are not dependent on each other for rendering; and decompress the compressed 3D graphics data that is formatted as video frames using the video acceleration hardware provided by the GPU based on information indicating association between 3D objects defined by the 3D graphics data and video frames comprising the compressed 3D graphics data;

wherein the 3D graphics data processing handler is further operative to instruct video acceleration hardware provided by the GPU to compress the 3D graphics data as one or more frames contained in one or more videos;

wherein the 3D graphics processing handler is further operative to selectively cache the compressed 3D graphics data on the GPU by updating one or more cache tables with information indicating the association between 3D objects defined by the cached compressed 3D graphics data and one or more video frames comprising the cached compressed 3D graphics data.

9. The apparatus of claim 8, wherein 3D graphics data processing handler is further operative to:
associate 3D objects defined by the 3D graphics data with video frames comprising the compressed 3D graphics data.

10. The apparatus of claim 8, the 3D graphics data is compressed as H.264 intra-frames.

11. The apparatus of claim 8, wherein the compressed 3D graphics data is decompressed by decompressing one or more video frames comprising the compressed 3D graphics data.

12. The apparatus of claim 8, where in the 3D graphics data defines at least one of the following:
texture map;
displacement map; and
normal map.

13. The apparatus of claim 8, where in the 3D graphics handler is further operative to determine whether the video acceleration hardware can decompress the compressed 3D graphics data, and decompressing the compressed 3D graphics data using video acceleration hardware provided by the GPU, in response to a determination that the video acceleration hardware provided by the GPU can decompress the compressed 3D graphics data.

14. The apparatus of claim 8 further comprising
memory, operatively connected to the 3D graphics processing handler, configured to store the information indicating the association between 3D objects defined by the 3D graphics data and the video frames comprising the compressed 3D graphics data; and
a GPU, operatively connected to the 3D graphics processing handler, comprising:
video acceleration hardware operative to encode and decode video; and
memory configured to store graphics data.

15. A non-transitory computer readable medium comprising executable instructions that when executed by one or more processors cause the one or more processors to:
instruct video acceleration hardware provided by the GPU to decompress 3D graphics data that is compressed as one or more formatted video frames contained in one or more videos the 3D graphics data being data able to be processed by a graphics rendering engine wherein the 3D graphics data is compressed as video frames that are not dependent on each other for rendering;
decompress the compressed 3D graphics data using the video acceleration hardware provided by the GPU based on information indicating association between 3D objects defined by the 3D graphics data in the video frames comprising the compressed 3D graphics data;

wherein the executable instructions when executed by one or more processors causes one or more processors further to selectively cache the compressed 3D graphics data on the GPU; and
wherein the selective caching comprises updating one or more cache tables with information indicating the association between 3D objects defined by the cached compressed 3D graphics data and one or more video frames comprising the compressed 3D graphics data.

16. The non-transitory computer readable medium of claim 15, wherein the executable instructions when executed by one or more processors causes one or more processors further to:
instruct video acceleration hardware provided by the GPU to compress the 3D graphics data as one or more frames contained in one or more videos.

17. The non-transitory computer readable medium of claim 16, the 3D graphics data is compressed as H.264 intra-frames.

18. The non-transitory computer readable medium of claim 15, wherein the executable instructions when executed by one or more processors causes one or more processors further to:
associate 3D objects defined by the 3D graphics data with video frames comprising the compressed 3D graphics data.

19. The non-transitory computer readable medium of claim 15, wherein decompressing the compressed 3D graphics data comprises decompressing the videos having the frames comprising the compressed 3D graphics data.

20. The non-transitory computer readable medium of claim 15, wherein the compressed 3D graphics data is decompressed by decompressing one or more video frames comprising the 3D graphics data.

21. The non-transitory computer readable medium of claim 15, wherein the executable instructions when executed by one or more processors causes one or more processors further to:
determine whether the video acceleration hardware can decompress the compressed 3D graphics data, and decompressing the compressed 3D graphics data using video acceleration hardware provided by the GPU, in response to a determination that the video acceleration hardware provided by the GPU can decompress the compressed 3D graphics data.

22. A method for processing three dimensional (3D) graphics data, the method comprising:
decompressing, by decompressing logic, compressed 3D graphics data that is formatted as video frames wherein the 3D graphics data is compressed as video frames that are not dependent on each other for rendering, using video acceleration hardware provided by a graphics processing unit (GPU) based on information indicating an association between a plurality of 3D objects defined by the 3D graphics data in the video frames, the graphics data being data able to be received for rendering by a graphics rendering engine to render one or more images.

23. The method of claim 22 comprising displaying the decompressed 3D graphics data on a display.

24. An apparatus operative to process 3D graphics data, the apparatus comprising:
logic comprising a 3D graphics data processing handler, operatively connected to a graphics processing unit (GPU), operative to:
instruct video acceleration hardware provided by the GPU to compress the 3D graphics data as one or more frames contained in one or more videos wherein the 3D graphics data is compressed as video frames that are not dependent on each other for rendering, thereby forming association between 3D objects defined by the 3D graphics data and corresponding video frames comprising the compressed 3D graphics data for performing subsequent decompression of the compressed 3D graphics data based on the association, graphics data being data able to be processed by a graphics rendering engine of the GPU; and associate the 3D objects defined by the 3D graphics data with the corresponding video frames comprising the compressed 3D graphics data for forming at least one video file including the 3D objects and the corresponding video frames comprising the compressed 3D graphics data.

25. A computer graphics system including:
a first processor,
a graphics processing unit (GPU) including video acceleration hardware;
the first processor operable to issue a control command causing the video processing hardware of the GPU to access a memory storing at least one video file including compressed 3D graphics data therein formatted as video frames of the video file, wherein the 3D graphics data is data able to be processed by the GPU to produce one or more 3D graphics objects and wherein the 3D graphics data is compressed as video frames that are not dependent on each other for rendering;
the GPU, upon receiving the control command, being operable to:
access the at least one video;
determine one or more video frames of the video that correspond to the compressed 3D graphics data;
decompress the 3D graphics data in the video frames using the video acceleration hardware provided by the GPU based on information indicating association between 3D objects defined by the 3D graphics data and video frames comprising the compressed 3D graphics data; and
a cache memory storing a cache table, the cache table including the association between the 3D graphics objects and the one or more video frames of the video that correspond to the 3D graphics data.

26. The system of claim 25, wherein the control command further informs the GPU of a location within memory where the video file containing the compressed 3D graphics data is stored.

27. The system of claim 25, wherein the GPU uses the 3D graphics data to render 3D graphics objects.

28. The system of claim 25, further including a cache memory accessible by the GPU; wherein the GPU is further instructed to cache decompressed 3D graphics data in the cache memory accessible by the GPU.

29. The system of claim 25, wherein the 3D graphics data includes at least one of texture map data, normal map data, and displacement map data.

30. A method for processing three dimensional (3D) graphics data, the method comprising:
compressing, using a processor or video acceleration hardware of a graphics processing unit (GPU), 3D graphics data as one or more formatted video frames, the 3D graphics data being data able to be processed by a graphics rendering engine of the GPU;
associating 3D objects defined by the 3D graphics data with corresponding video frames comprising the compressed 3D graphics data formatted as video frames for forming at least one video file including the 3D objects and the corresponding video frames comprising the compressed 3D graphics data;
selectively caching of the compressed 3D graphics data on the GPU; and
wherein the selective caching comprises updating one or more cache tables with information indicating the association between 3D objects defined by the cached compressed 3D graphics data and one or more video frames comprising the cached compressed 3D graphics data.

31. An apparatus operative to process 3D graphics data, the apparatus comprising:
logic comprising a 3D graphics data processing handler, operatively connected to a graphics processing unit (GPU), operative to:
instruct video acceleration hardware provided by the GPU to decompress 3D graphics data that is compressed as one or more formatted video frames, the 3D graphics data being data able to be processed by a graphics rendering engine of the GPU;
decompress the compressed 3D graphics data that is formatted as video frames using the video acceleration hardware provided by the GPU based on information indicating association between 3D objects defined by the 3D graphics data and video frames comprising the compressed 3D graphics data;
wherein the 3D graphics data processing handler is further operative to instruct video acceleration hardware provided by the GPU to compress the 3D graphics data as one or more frames contained in one or more videos;
wherein the 3D graphics processing handler is further operative to selectively cache the compressed 3D graphics data on the GPU; and
wherein the selective caching comprises updating one or more cache tables with information indicating the association between 3D objects defined by the cached compressed 3D graphics data and one or more video frames comprising the cached compressed 3D graphics data.

32. A non-transitory computer readable medium comprising executable instructions that when executed by one or more processors cause the one or more processors to:
instruct video acceleration hardware provided by the GPU to decompress 3D graphics data that is compressed as one or more formatted video frames contained in one or more videos the 3D graphics data being data able to be processed by a graphics rendering engine;
decompress the compressed 3D graphics data using the video acceleration hardware provided by the GPU based on information indicating association between 3D objects defined by the 3D graphics data in the video frames comprising the compressed 3D graphics data;
wherein the executable instructions when executed by one or more processors causes one or more processors further to selectively cache the compressed 3D graphics data on the GPU; and
wherein the selective caching comprises updating one or more cache tables with information indicating the association between 3D objects defined by the cached compressed 3D graphics data and one or more video frames comprising the cached compressed 3D graphics data.

33. A computer graphics system including:
a first processor;
a graphics processing unit (GPU) including video acceleration hardware;

the first processor operable to issue a control command causing the video processing hardware of the GPU to access a memory storing at least one video file including compressed 3D graphics data therein formatted as video frames of the video file, wherein the 3D graphics data is data able to be processed by the GPU to produce one or more 3D graphics objects;

the GPU, upon receiving the control command, being operable to:

access the at least one video;

determine one or more video frames of the video that correspond to the compressed 3D graphics data;

decompress the 3D graphics data in the video frames using the video acceleration hardware provided by the GPU based on information indicating association between 3D objects defined by the 3D graphics data and video frames comprising the compressed 3D graphics data; and a cache memory storing a cache table, the cache table including the association between the 3D graphics objects and the one or more video frames of the video that correspond to the 3D graphics data.

* * * * *